US006690912B1

(12) United States Patent
Vaughn

(10) Patent No.: US 6,690,912 B1
(45) Date of Patent: Feb. 10, 2004

(54) AUDIO AND VISUAL MESSAGE CENTER

(76) Inventor: Larry F. Vaughn, 1158 Mansfield Ave., Indiana, PA (US) 15701

(*) Notice: Subject to any disclaimer, the term of this patent is extended or adjusted under 35 U.S.C. 154(b) by 80 days.

(21) Appl. No.: 09/391,145

(22) Filed: Sep. 7, 1999

(51) Int. Cl.[7] .............................. G09B 5/00; B43L 1/00
(52) U.S. Cl. ....................................... 434/308; 434/408
(58) Field of Search ................................ 704/272, 270, 704/278; 40/611, 618; 434/365, 308, 430, 408; 428/81, 99, 192; 368/240, 41, 223

(56) References Cited

U.S. PATENT DOCUMENTS 3,999,050 A * 12/1976 Pitroda ....................... 235/152
4,045,897 A * 9/1977 Gates ......................... 434/430
4,618,151 A * 10/1986 Fadner ................... 273/148 A
4,767,119 A * 8/1988 Fadner ................... 273/148 A
4,797,914 A * 1/1989 Vaello ......................... 379/96
D311,026 S * 10/1990 DePoyster ................... D19/25
5,241,494 A 8/1993 Blyth et al.
5,259,024 A * 11/1993 Morley ........................ 379/88
5,267,900 A * 12/1993 Clayton ....................... 462/14
D343,859 S * 2/1994 Fisher ......................... D19/20
5,360,345 A 11/1994 Brauner et al.
5,387,108 A 2/1995 Crowell
5,425,078 A 6/1995 Stern
5,463,369 A 10/1995 Lamping
5,490,206 A 2/1996 Stern
5,504,836 A 4/1996 Loudermilk
5,577,918 A 11/1996 Crowell
5,655,323 A * 8/1997 Lassoff ........................ 40/611
5,755,338 A 5/1998 vom Braucke et al.
5,768,349 A * 6/1998 Knuth ......................... 379/88
5,798,686 A 8/1998 Schreiner
5,836,616 A 11/1998 Cooper
5,876,067 A * 3/1999 Kaplan ...................... 281/15.1
5,890,121 A * 3/1999 Borcherding ............... 704/272
5,903,869 A 5/1999 Jacobson et al.
5,948,498 A * 9/1999 Bianco ........................ 428/81
5,987,825 A * 11/1999 Rosen ........................ 52/36.1
6,002,779 A * 12/1999 Johnston ..................... 381/80
6,007,891 A * 12/1999 Davis .......................... 428/81
6,032,393 A * 3/2000 Maxim ........................ 40/548

* cited by examiner

*Primary Examiner*—Kurt Fernstrom
(74) *Attorney, Agent, or Firm*—Luedeka, Neely & Graham PC

(57) ABSTRACT

An audio and visual message center provides a plurality of communication devices for family members, students or co-workers. The message center has one or more visual communication devices selected from an erasable board, a calendar, a pressure sensitive adhesive surface area, a cork board, a felt pad, a clip board, a note pad or a metal surface. The message center provides an audio message communication in a record/playback device.

22 Claims, 7 Drawing Sheets

AUDIO AND VISUAL MESSAGE CENTER

FIELD OF THE INVENTION

The invention relates to a message display device and more specifically to a device for posting audio and visual messages.

BACKGROUND

A wide variety of visual message display devices such as bulletin boards, cork boards, erasable marking boards and felt boards have been produced. Such devices are typically designed to communicate by a single visual means. However, it may be difficult to adequately address all of the communication needs of a home, office or school by use of a single visual means. Individuals often have busy and varying schedules and require more information be communicated quickly as their lives become more hectic. Family members, students and co-workers often have different schedules or rotating shifts and are not commonly available to give and/or receive general information at the same time.

There is a need, therefore, for a means of multiple communication which is adaptable to provide sufficient information in order to adequately communicate with individuals at home, school or in the office.

SUMMARY

With regard to the foregoing and other objects, the invention provides a message center which includes a rectangular tray having a first side and a second side. The first side of the tray contains at least two substantially discrete sections and the second side of the tray contains means for attaching the tray to a substantially vertical surface. The discrete sections on the first side include a first section containing a visual display section which may include one or more of the following: an erasable board, a calendar, a pressure sensitive adhesive surface area, a cork board, a felt pad, a clip board, a note pad, a metal surface, or any combination thereof. The second section included on the first side contains an audio record/playback device.

In another aspect, the invention provides a method for communicating messages to family members, students or co-workers which comprises providing a message center, the message center including a rectangular tray having a first side and a second side, the first side containing at least two substantially discrete sections and the second side containing means for attaching the tray to a substantially vertical surface. The discrete sections are disposed on the first side and include a first section including a visual display section selected from an erasable board, a calendar, a pressure sensitive adhesive surface area, a cork board, a felt pad, a clip board, a metal surface or a combination of two or more of the foregoing. A second section contains an audio record/playback device. One or more messages are posted on the message center board by audio or visual means or a combination of audio and visual means.

An advantage of the invention is that it provides a relatively inexpensive, expedient and simple means for communicating important information to family members, students, co-workers or others through a variety of communication means. The communication device described herein is adaptable for a variety of visual media and includes a record/playback section for audio messages which greatly enhances the visual messages which may be posted on the message center. The communication device described herein also has the advantage of providing a backup or secondary means of communication, therefore improving the likelihood that messages will not be lost if there is an unintentional removal of either the audio or visual message.

BRIEF DESCRIPTION OF THE DRAWINGS

The above and other features, aspects and advantages of the present invention will now be discussed in the following detailed description and appended claims considered in conjunction with the accompanying drawings in which:

DETAILED DESCRIPTION OF A PREFERRED EMBODIMENT

Figure 1:
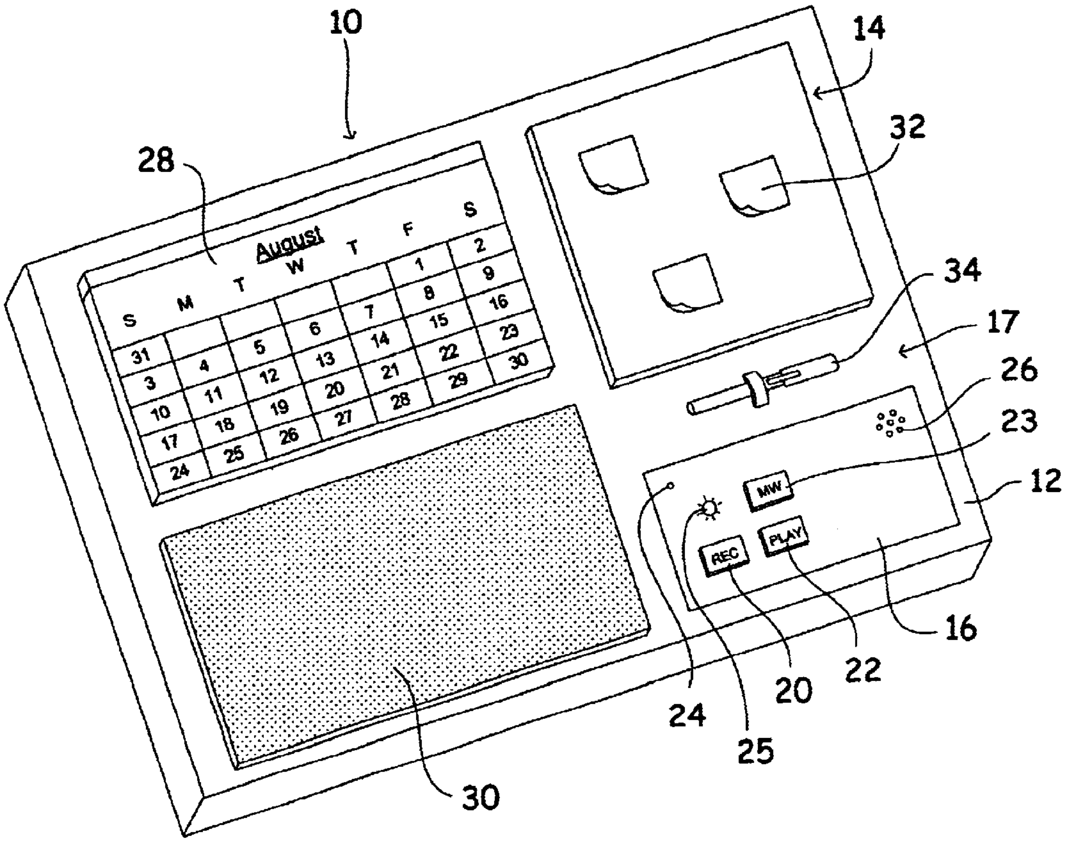
FIG. 1 is a top perspective view of an audio and visual message display device according to the invention.

Referring now to the drawings in which like reference characters designate like or similar parts throughout the several views, FIG. 1 illustrates a message center 10 according to the present invention. The message center 10 includes a tray 12 having a substantially rectangular body containing at least two discrete sections 14 and 16 on a first side 17 thereof A first discrete section 14 contains one or more visual displays that allow a user to post visual messages to other users of the message center 10 in a variety of ways. The first discrete section 14 can be of any size or orientation required to provide one or more visual displays, as required. A second discrete section 16 contains an audio record/playback device 18 containing operating features on its face, such as a record switch 20, a play switch 22, a message waiting switch 23, a microphone 24, a message indicator 25 and a speaker 26.

Figure 2:
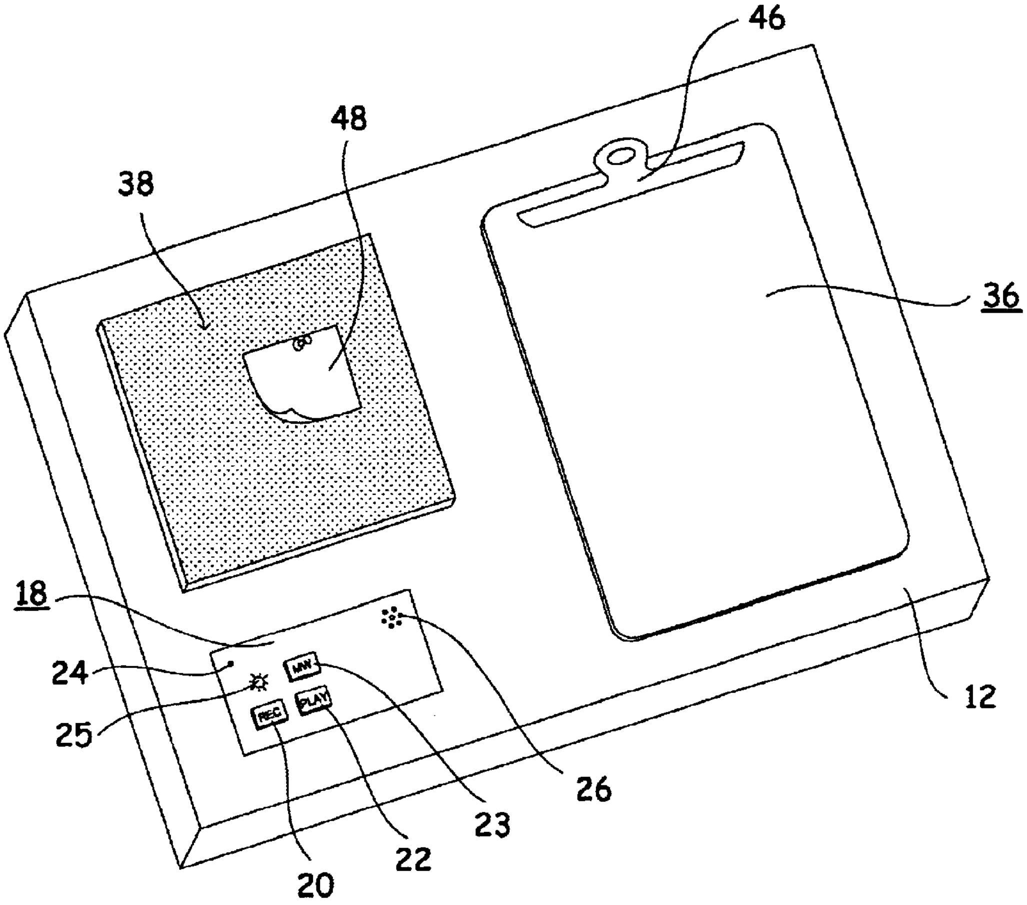
FIG. 2 is a plan view of the first side of an audio and visual message center according to an alternative embodiment of the invention.
Figure 3:
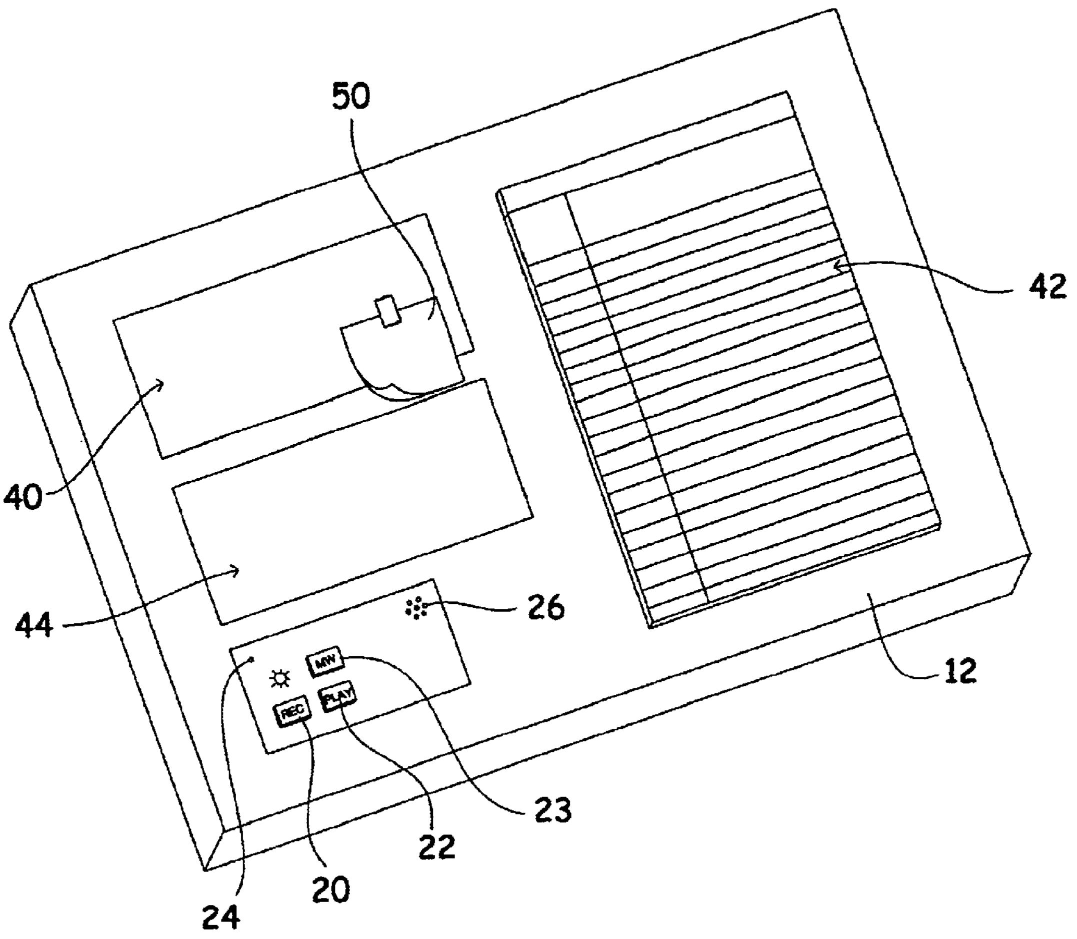
FIG. 3 is a plan view of the first side of an audio and visual message center according to another embodiment of the invention.

With reference to FIGS. 1–3, various visual display components of the first discrete section 14 may be selected from a calendar 28, an erasable board 30, a pressure sensitive adhesive surface area 32, a clip board 36, a cork board 38, a metal surface 40, a note pad 42, a felt pad 44 or any combination of two or more of the foregoing. With regard to the individual visual display components, the calendar 28 is preferably removably mounted to the tray 12 to enable replacement of expended calendars with a new calendar 28. The pressure sensitive adhesive surface area 32 allows written paper notes to be affixed to the adhesive surface without an additional attachment means. The erasable board 30 includes any common dry erase board 32 or chalk board. A writing utensil 34, such as chalk or a dry erase marker, is provided for use with the board so that the family member, student or co-worker can write messages or reminders on the surface of the board 30. The clip board 36 allows notes and other note pads to be mounted and retained thereon by a spring actuated retaining device 46. The cork board 38 provides convenient note posting thereon with tacks 48, or staples. The metal surface 40 provides convenient note posting with household magnets 50 or the surface itself may be magnetic for attaching metal clips or metal holders thereto. The note pad 42 provides a surface for writing messages and is preferably removably mounted to the tray 12 to allow for replacement of an expended pad.

The alternative embodiments shown in FIGS. 1–3 are only illustrative examples of possible combinations. Other combinations or placements of two or more of the foregoing visual display components may be used with the audio record/playback device 18. Section 14 may include any number or combination of visual display components desired to enable the use of the message center 10 in a variety of locations and to provide a variety of means for communicating depending on the use and location thereof Furthermore, although only the note pad 42 and calendar 28 are described as being removably mounted to the tray 12 to support their utility, any or all of the visual display devices may be removably mounted to the tray.

A plurality of substantially congruent visual displays may be provided with the tray 12 for an interchangeable message center 10 which may be customized by the user thereof. Thus, a family member, student or co-worker may choose and replace visual display components with another like sized display that better fits his or her particular needs. In order to removably mount the visual display components in section 14, the tray 12 may include slots, adhesive surfaces, hook and loop fasteners, button fasteners, snap fasteners or any other means for removably attaching the visual display components to the first side 17 of tray 12.

Figure 4:
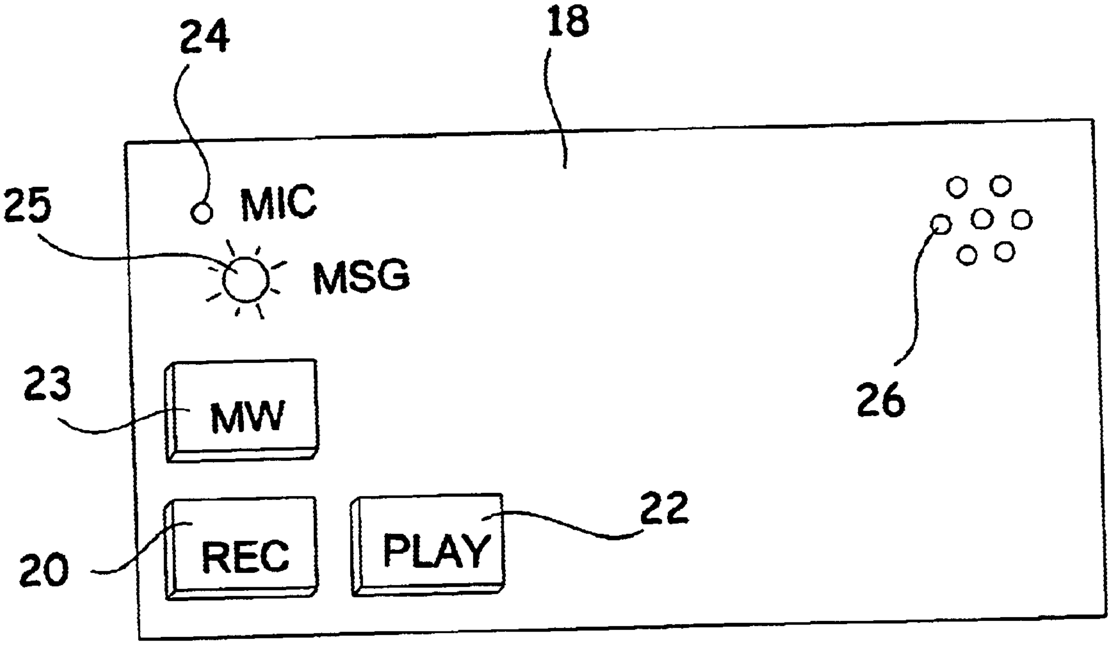
FIG. 4 is a plan view of an audio record/playback device according to the invention.

Various record/playback devices 18 may be used in the second section 16 of the message center 10. The record/playback device 18, as shown in detail in FIG. 4, provides an audio messaging system for use in conjunction with the visual display components described above. Operation of such a device 18 should preferably remain simple and convenient. As shown, the operating features of the device 18 include depressible record 20, play 22 and message waiting 23 switches which may be push button single throw switches, toggle switches, micro-switch and the like. Other features of the device 18 include a speaker 26, a microphone 24, and/or a flashing message indicator LED 25 to alert another person that an audio message has been recorded.

To provide an audio message, a family member, student or co-worker may depress and hold the record switch 20, speak through the microphone 24 with the desired message, then release the record switch 20 and depress the message waiting switch 23. The message is now stored for retrieval and the message waiting indicator 25 will blink. To retrieve a message, the person for whom the message was intended may simply press the play switch 22 to hear the recorded message through the speaker 26. After receiving the message, the message waiting switch 23 may again be depressed to turn off the message waiting indicator 25. With the aforementioned device 18, the message is erased when the next message is recorded.

Figure 5:
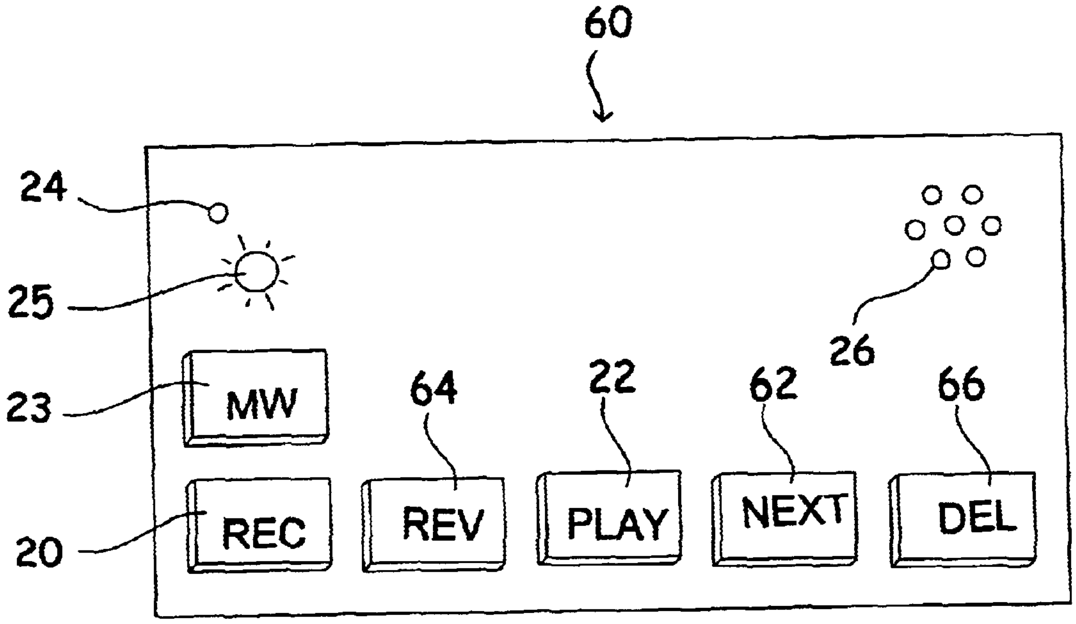
FIGS. 5 and 6 are plan views of alternative audio record/playback devices according to the invention.

In the alternative, an audio record/playback device 60 capable of storing multiple messages in a queue, as in FIG. 5, may be attached to the tray 12 in the second section 16. In this embodiment, the device 60 includes additional common record/playback features such as a next message switch 62, replay switch 64, delete switch 66 in addition to the record, play and message waiting switches 20, 22 and 23. A message may be recorded on the device 60 in the same manner as described above with reference to device 18. Consecutive messages may also be stored on the device 60 without erasing a previous message. When messages are played, the user may depress and release the next message switch 62 to skip to the desired message in the queue, depress and release the replay switch 64 to return to a previous message in the queue, or depress and release the delete switch 66 to erase the current message in the queue.

Figure 6:
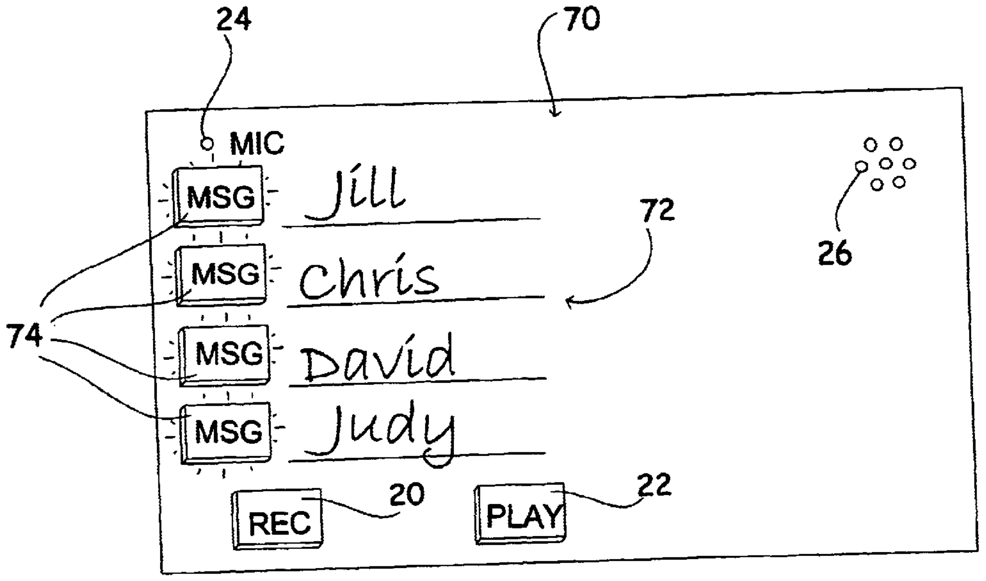

According to another aspect of the invention shown in FIG. 6, an audio record/playback device 70 for use in the second section 16 of the message center 10 may include a plurality of electronic mailboxes to support storing messages for separate users. The plurality of electronic mailboxes are provided in a visual menu format 72 for each user. Mailbox selection switches 74 next to each user designation provide address inputs which correspond to that user's electronic message mailbox to be used with the record and play switches 20 and 22. To provide a message, the family member, student or co-worker depresses and releases the particular user selection switch 74, then depresses and holds the record switch 20, speaks through the microphone 24 with the message for the selected person, then releases the record switch 20. The message is now stored for retrieval. To retrieve a message from an electronic mailbox, the person for whom the message was intended depresses and releases the user selection switch 74 then depresses and releases the play switch 22 to hear the recorded message through speaker 26. The multiple message system described in FIG. 5 and other mailbox interfaces such as alpha and/or numeric keypads, LCD interfaces, etc. may also be incorporated in any of the record/playback devices 18, 62, or 70 described above.

The preferred embodiment of the invention includes battery operated digital voice recording circuits, however audio tape recording circuits which may be battery operated or operated by alternating current are an acceptable alternative. The digital voice recording and playback circuits may be any commercially available digital recording devices, such as single chip recording devices as disclosed in U.S. Pat. No. 5,241,494 to Blyth et al. entitled "Integrated Circuit System for Analog Recording and Playback", and are available under the name CHIPCORDER® from Information Storage Devices, Inc. of San Jose, Calif. The design and operation of such devices is described in U.S. Pat. No. 5,241,494, the disclosure of which is incorporated herein by reference as if fully set forth.

Figure 7:
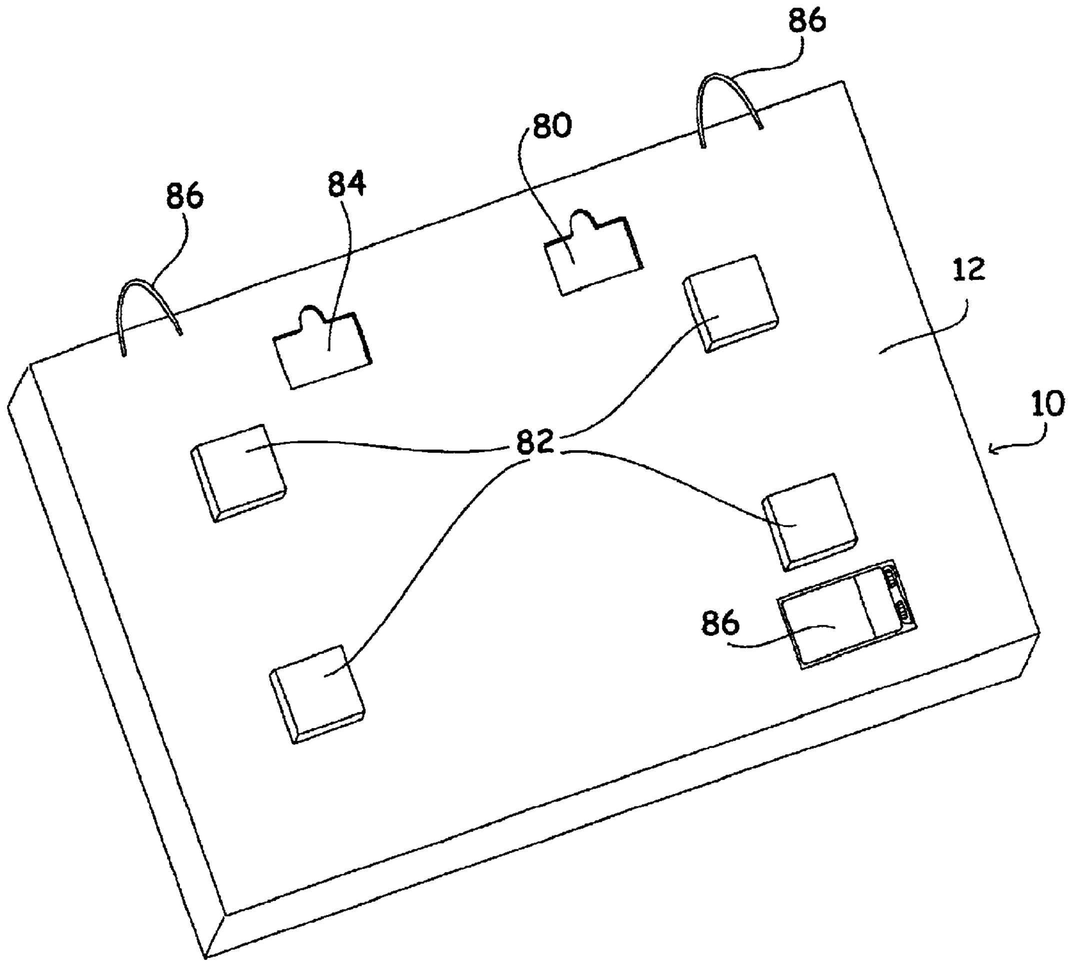
FIG. 7 is a plan view of the second side of an audio and visual message center according to the invention.

Referring now to FIG. 7, the second side 80 of tray 12 of the message center 10 may be made of paperboard or any other suitable material and attached to the tray by adhesives or other well known means. The second side 80 also includes one or more means for attaching the message center to a vertical surface. Such means may include attachment devices 82 such as adhesive pads or magnets for attaching the message center to a metal surface, such as a refrigerator. Apertures 84 may also be included in the surface of the second side 80 for positioning the message center on a hook or nail commonly used to mount picture frames or other similar devices on a wall, etc. Alternative vertical support devices include hinged hoops 86 used in a similar fashion to the apertures 84. A door 86 enclosing the battery compartment thereunder is also preferably provided for the record/playback device 18, 16, or 70 on the second side 80. The door 86 may be a separate hinged door which is attached to the second side 80 or it may be cut out on three sides from the second side material in order to provide a hinged door.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

What is claimed is:

1. A message center consisting essentially of a rectangular tray having a first side and a second side, said first side containing at least two substantially discrete sections and said second side containing means for attaching the tray to a substantially vertical surface, wherein said discrete sections include a first section including a visual display selected from the group consisting of an erasable board, a calendar, a pressure sensitive adhesive surface area, a cork board, a felt pad, a clip board, a note pad, a metal surface, and a second section containing an audio record/playback device, and wherein said second side of said tray contains an access opening for said second section for a battery compartment for said audio record/playback device.

2. The message center of claim 1 wherein said audio record/playback device comprises a digital record/playback device.

3. The message center of claim 1 wherein said first section comprises an erasable board and a calendar.

4. The message center of claim 3 wherein said first section further comprises a pressure sensitive adhesive surface area.

5. The message center of claim 3 wherein said first section further comprises a felt pad.

6. The message center of claim 1 wherein said means for attaching comprises one or more magnets.

7. The message center of claim 1 wherein said means for attaching comprises one or more apertures, hoops or slots for attaching said tray to a wall.

8. The message center of claim 1 further comprising a door covering said access opening in said second side for inserting or removing the battery.

9. The message center of claim 1 wherein said audio record/playback device stores a plurality of messages in a queue.

10. The message center of claim 1 wherein said audio record/playback device contains a plurality of mailboxes for storing messages.

11. The message center of claim 1 wherein the first section comprises a dry erasable calendar and a dry erasable board.

12. A message center consisting essentially of a rectangular tray having a first side and a second side, said first side containing at least two substantially discrete tray sections and said second side containing means for attaching the tray to a substantially vertical surface, wherein said discrete sections include a first tray section including a visual display selected from two or more of an erasable board, a calendar, a pressure sensitive adhesive surface area, a cork board, a felt pad, a clip board, a note pad and a metal surface; and a second tray section containing a digital audio record/playback device, and wherein said second side of said tray contains an access opening for said second section for a battery compartment for said digital audio record/playback device.

13. The message center of claim 12 wherein said digital audio record/playback device contains a plurality of mailboxes for storing messages.

14. The message center of claim 12 wherein said first section comprises an erasable board, a calendar, and a pressure sensitive adhesive surface area.

15. The message center of claim 12 wherein the first section comprises a dry erasable board and a calendar.

16. A method for communicating messages to family members, students or co-workers comprising providing a message center, the message center consisting essentially of a rectangular tray having a first side and a second side, the first side containing at least two substantially discrete sections and the second side containing means for attaching the tray to a substantially vertical surface, wherein the discrete sections include a first section including a visual display selected from one or more of an erasable board, a calendar, a pressure sensitive adhesive surface area, a cork board, a felt pad, a clip board, a note pad and a metal surface; and a second section containing an audio record/playback device, and wherein the second side of the tray contains an access opening for the second section for a battery compartment for the audio record/playback device;

posting one or more messages on the message center board by audio or visual means or a combination of audio and visual means.

17. The method of claim 16 wherein the audio record/playback device comprises a digital record/playback device, further comprising recording a digital message on the digital record/playback device.

18. The method of claim 16 wherein the first section comprises an erasable board and a calendar, further comprising displaying a visual message on the erasable board or calendar or both erasable board and calendar.

19. The method of claim 18 wherein the first section includes a pressure sensitive adhesive surface area, further comprising attaching a written message to the pressure sensitive adhesive.

20. The method of claim 16 wherein the means for attaching comprises one or more magnets, further comprising attaching the rectangular tray to a metal surface.

21. The method of claim 16 wherein the digital audio record/playback device contains a plurality of mailboxes, further comprising recording a message in two or more mailboxes on the audio record/playback device.

22. The method of claim 16 wherein said audio record/playback device stores a plurality of messages in a queue, further comprising recording two or more messages in the queue.

* * * * *